United States Patent [19]
Davis et al.

[11] Patent Number: 6,088,805
[45] Date of Patent: Jul. 11, 2000

[54] SYSTEMS, METHODS AND COMPUTER PROGRAM PRODUCTS FOR AUTHENTICATING CLIENT REQUESTS WITH CLIENT CERTIFICATE INFORMATION

[75] Inventors: Mark Charles Davis, Durham; Steve D. Gray, Raleigh; David Gerard Kuehr-McLaren, Apex; Ian A. Morrison, Raleigh; Timothy G. Shoriak, Cary, all of N.C.

[73] Assignee: International Business Machines Corporation, Armonk, N.Y.

[21] Appl. No.: 09/023,863

[22] Filed: Feb. 13, 1998

[51] Int. Cl.[7] .................................................. G06F 13/00
[52] U.S. Cl. .......................................... 713/202; 713/201
[58] Field of Search ................................... 713/200, 201, 713/202; 711/161; 380/21, 25, 23, 3, 4, 28, 24, 26, 30; 708/314; 395/712; 709/203, 223, 224, 227, 237, 389

[56] References Cited

U.S. PATENT DOCUMENTS

| | | | |
|---|---|---|---|
| 5,564,037 | 10/1996 | Lam | 711/161 |
| 5,671,279 | 9/1997 | Elgamal | 380/23 |
| 5,701,492 | 12/1997 | Wadsworth et al. | 395/712 |
| 5,778,065 | 7/1998 | Hauser et al. | 380/21 |
| 5,812,430 | 9/1998 | Altschuler et al. | 708/314 |
| 5,815,574 | 9/1998 | Fortinsky | 380/25 |
| 5,884,024 | 3/1999 | Lim et al. | 713/201 |
| 5,922,074 | 7/1999 | Richard et al. | 713/200 |
| 5,958,053 | 12/1999 | Denker | 713/201 |
| 6,003,083 | 12/1999 | Davies et al. | 709/226 |
| 6,006,018 | 12/1999 | Burnett et al. | 709/219 |

*Primary Examiner*—Joseph E. Palys
*Assistant Examiner*—Rijue Mai
*Attorney, Agent, or Firm*—Myers Bigel Sibley & Sajovec, P.A.; Jeanine S. Ray-Yarletts

[57] ABSTRACT

Methods, systems and computer program products authenticate client requests to access server resources. A server receives a certificate containing multiple data fields associated with the client making a request. The server selects data from at least one of the certificate data fields and filters the selected data using at least one predefined filter rule associated with the requested server resources to authenticate the client request. Combinations of filter rules may be utilized and the server may select data from various combinations of data fields.

21 Claims, 3 Drawing Sheets

SYSTEMS, METHODS AND COMPUTER PROGRAM PRODUCTS FOR AUTHENTICATING CLIENT REQUESTS WITH CLIENT CERTIFICATE INFORMATION

FIELD OF THE INVENTION

The present invention relates generally to client-server communications, and more particularly to client-server communications for controlling access to server resources.

BACKGROUND OF THE INVENTION

In client-server communications, a client communicates with a server via a public communications network, such as the Internet, or a private communications network, such as an Intranet. With respect to the Internet, a web browser communicates with a web server using the Transmission Control Protocol/Internet Protocol (TCP/IP). For the majority of Internet communications, a web browser communicates with a web server using the generic Hyper-Text Transfer Protocol (HTTP) which is transmitted between the web browser and the web server over the TCP/IP link between the web browser and the web server. Most web browsers also enable clients to access other server resources and services including File Transfer Protocol (FTP), Telnet, Wide-Area Information Servers (WAIS), and the like.

Two important security issues related to client-server communications are privacy and authentication. Privacy involves keeping anyone except the intended recipient from being able to read a communication between a client and a server. Privacy is typically accomplished using cryptography wherein communications are encrypted prior to transmission and decrypted upon receipt. Authentication involves verifying that the entity with whom a client or server is communicating is, in fact, who the client or server thinks the entity is.

HTTP-layer authentication typically requires HTTP challenge-response requests between a client and web server for access to server resources. This type of authentication typically requires the user to provide a user name and password to the server which then validates this information by comparing it with information contained within an access control list (ACL). Another authentication method utilizes digital certificates (referred to hereinafter as "certificates"). A certificate is a set of data that identifies an entity, and verifies that the specific public encryption and signature keys included within the certificate belong to that entity. A certificate is issued by a Certification Authority (CA) only after the CA has verified that the specified public encryption key belongs to the specified entity.

When a client sends a request to access certain resources via a server, the server may request that the client transmit a certificate to the server for authentication purposes. When the server receives the certificate, it looks at the IP address of the client sending the certificate or the name of the individual user sending the request and then checks an ACL containing the IP addresses or user names authorized to access the requested resources.

Unfortunately, this procedure can be inefficient and time consuming, especially when the ACL contains many IP addresses and/or user names. In addition, this procedure typically requires that ACLs be updated each time an individual user is granted or denied access to specific server resources. This can add significantly to the task of network administration. Thus, it would be desirable to be able to change the access rights of users without having to modify an ACL each time there is a change involving users authorized to access the server. It would also be desirable to be able to increase the criteria upon which access to server resources can be based.

SUMMARY OF THE INVENTION

In view of the above discussion, it is an object of the present invention to lessen the administrative burdens involved in maintaining ACLs.

It is another object of the present invention to increase the criteria upon which access to server resources can be based.

It is another object of the present invention to extend the functionality of certificates used to authenticate client-server requests.

These and other objects of the present invention are provided by methods, systems and computer program products for authenticating a client request to access server resources. A server receives a certificate containing multiple data fields associated with the client making a request. The data fields contain various information related to the requesting client, including the chain of certificate authorities and attributes from their certificates. The server selects data from at least one of the certificate data fields and filters the selected data using at least one predefined filter rule associated with the requested server resources to authenticate the client request. Combinations of filter rules may be utilized and the server may select data from various combinations of data fields.

Some certificate data fields may have sub-fields associated therewith. For example, the distinguished name field of a certificate often has multiple sub-fields associated therewith. The server may select data from the sub-fields of a field, alone or in combination with data from other fields and sub-fields. In addition, the server may request the client to send additional user identification information to the server. The server may filter this additional user identification information using at least one predefined filter rule associated with the requested server resources.

Filter rules define which users have access rights to particular server resources based on information contained in one or more data fields. By using one or more data fields, authentication may be performed on a more generalized basis. For example, access rights to a particular server resource may be granted to all users having a particular type of information one field. Access to another server resource may be granted to only those users having another type of information in the same or different field.

The present invention is advantageous because access to server resources can be based upon more generalized rules without having to define each user or IP address to a server. This can eliminate the burden of having to keep ACLs up-to-date with individual user information. Using the present invention, access rights can be granted or denied on a more generic level. Furthermore, the present invention allows complicated access rules to be designed using various information contained within a certificate. Accordingly, greater control over user access can be established.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Client-Server Communications

As is known to those with skill in the art, client-server environments may include public networks, such as the Internet, and private networks often referred to as "Intranets." Hereinafter, all references to server resources shall include resources accessible via any communications network, including, but not limited to web servers. Hereinafter, the term "Internet" shall incorporate the term "Intranet" and any references to accessing the Internet shall be understood to mean accessing an Intranet as well. Hereinafter, the term "computer network" shall incorporate publicly accessible computer networks and private computer networks.

Figure 1:
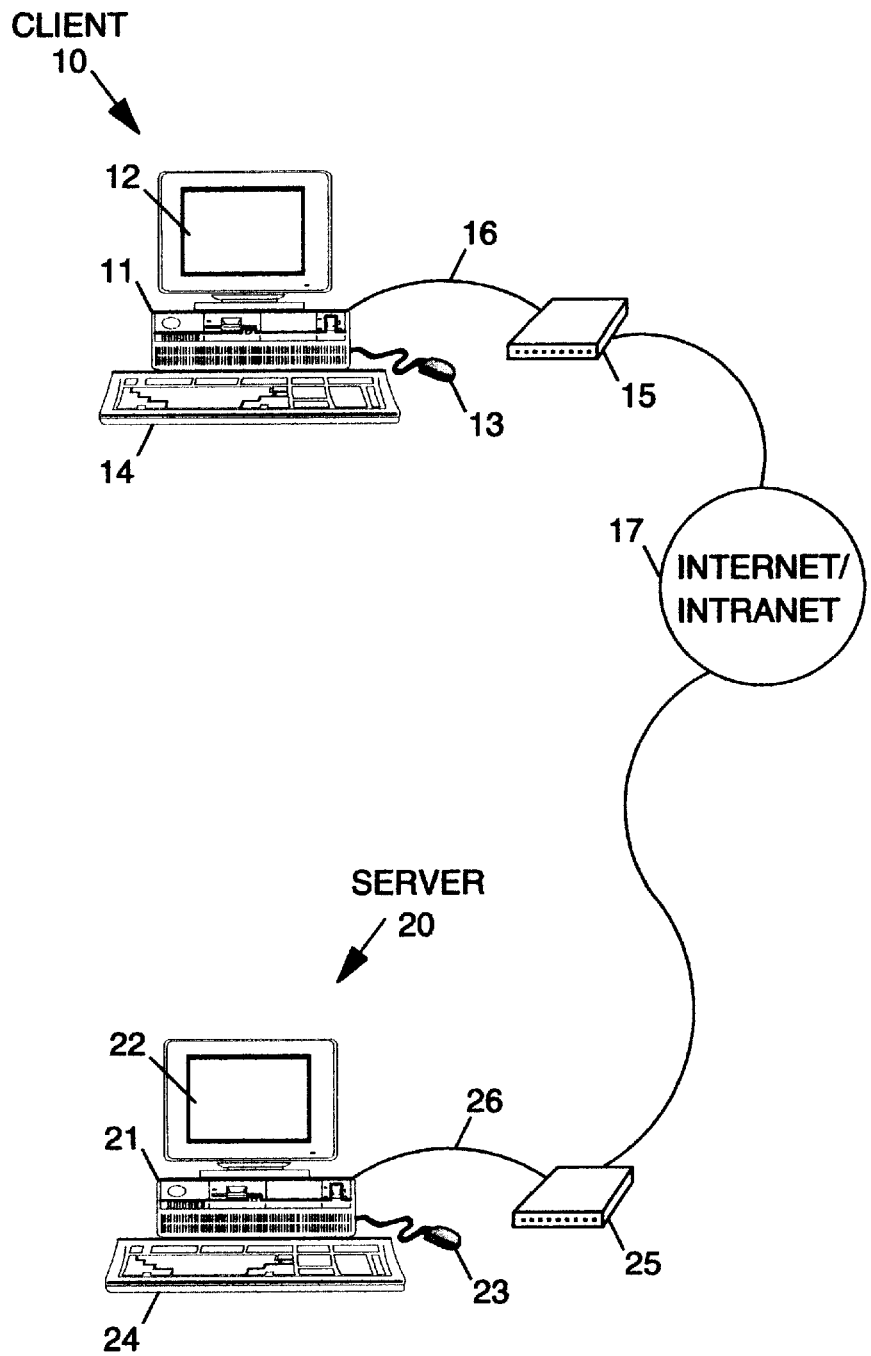
FIG. 1 schematically illustrates a client and server in communication via a computer network.

As illustrated in FIG. 1, users may access the Internet via a computer or terminal referred to as a client 10. Exemplary clients 10 may include, but are not limited to, an Apple®, Sun Microsystems®, IBM®, or IBM-compatible personal computer. A client 10 preferably includes a central processing unit 11, a display 12, a pointing device 13, a keyboard 14, access to persistent data storage, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via a modem 15 connected to traditional phone lines, an ISDN link, a T1 link, a T3 link, via cable television, via an ethernet network, and the like. The Internet connection 16 may be made via a third party, such as an "Internet Service Provider" ("ISP"). The Internet connection 16 may be made either by a direct connection of the client 10 to the Internet or indirectly via another device connected to the Internet. In the latter case, the client 10 is typically connected to this device via a local or wide area network (LAN or WAN). Preferably, data transfer rates between a client 10 and a server are equal to, or greater than, fourteen thousand four hundred baud (14,400 baud). However, lower data transfer rates are sometimes encountered.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server (described in detail below) to store various data transferred from the server.

Preferably, a client 10 has an Intel® 80386 processor (or equivalent) with at least eight megabytes (8 MB) of RAM, and at least five megabytes (5 MB) of persistent computer storage 15 for caching. Even more preferable is an Intel® 80486 or Pentium® processor (or equivalent). However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network personal computer, may be utilized in accordance with an embodiment of the present invention for accessing the Internet in a client capacity.

A user accesses web server resources by establishing a TCP connection between the client 10 and a server 20 (referred to hereinafter as a web server) hosting the resources. For the majority of Internet communications, a client communicates with a web server using HTTP protocol over the TCP connection between the client and web server. The data transferred between the client and the web server are HTTP data objects (e.g. HTML data). A web server may be a proxy that receives requests from a number of clients and routes the requests to the appropriate web server. A web server may also be referred to as an HTTP server. It is to be understood that the present invention is not limited to TCP/IP communications protocol. Other protocols may be utilized without departing from the spirit and intent of the present invention.

A web server 20 may have a configuration similar to that of a client 10 and may include a central processing unit 21, a display 22, a pointing device 23, a keyboard 24, access to persistent data storage 25, and an Internet connection 26 for connecting to the Internet 17 via a modem 25, or otherwise. It is preferable that a web server have an Intel® Pentium® processor or equivalent, at least sixteen megabytes (16 MB) of RAM, and at least eight hundred megabytes (800 MB) of data storage. However, a web server 20 may be implemented using other processors and via other computing devices, including, but not limited to, mainframe computing systems and mini-computers. Web server software handles requests from clients for documents, whether they are text, graphic, multimedia, or virtual. The web server software may run under the operating system of the web server.

It is understood that a client or web server or other apparatus configured to execute program code embodied within computer usable media, operates as means for performing the various functions and carries out the methods of the various operations of the present invention.

Secure Socket Layer Protocol

The Secure Socket Layer (SSL) protocol was developed by Netscape Communications Corporation, Mountain View, Calif., to allow secure transactions over the Internet. The SSL protocol is application independent and allows other protocols, such as HTTP, File Transfer Protocol (FTP) and Telnet to be layered on top transparently. The SSL protocol can negotiate encryption keys and can authenticate requests before data is exchanged between a client and server via higher-level applications.

The SSL protocol includes both server authentication and client authentication. With respect to server authentication, a server, in response to a client's request, sends its certificate and encryption preferences to the client. The client generates a master key, which it encrypts with the server's public key, and transmits the encrypted master key to the server. The server receives the encrypted master key and authenticates itself to the client by returning a message encrypted with the master key. The server then sends a request to the client to authenticate itself. The client authenticates itself to the server by returning its public key within a certificate. As is known to those skilled in the art, various cryptographic algorithms are supported by the SSL protocol.

Cryptography often involves the use of a pair of "keys" to encrypt and decrypt data. Related by a mathematical algorithm, the keys in the pair are often referred to as a "public" and a "private" key. As is known to those skilled in the art, the key used to encrypt data is often different than the key used to decrypt the same data. Typically, a private key is kept secret and its corresponding mate, the public key, is distributed to others. Typically, any public key can encrypt messages, but only the holder of the private key can decrypt and read them. A public key can also be used to decrypt messages, but typically only if the messages were encrypted by the private key in the pair.

For example, if a user wants to send a message to a server via a client, the client encrypts the message using the server's public key. The server decrypts the received message using the server's private key. Therefore, encryption may take place without having to share private keys. Clients and servers can send encrypted messages using only public keys, but typically can only decrypt a message if in possession of the correct private key.

Certificates

A certificate is a securely encoded data structure that includes the name and other identifying information about the holder of the certificate. A certificate also includes a public key that is used to verify the digital signature of the holder. The digital signature is made with a related, unique private key. Digital certificates enable clients and servers to reliably identify each other and protect any information that may be exchanged therebetween. Distributed by a trusted third party known as a Certificate Authority (CA), certificates contain identifying information about the certificate holder and the issuing organization that is difficult to forge or alter.

A CA is a trusted entity willing to vouch for the identities of those to whom it issues certificates. Exemplary CAs include: a company that issues certificates to its employees; a professional body that issues certificates to its members; and a country that issues certificates to its citizens. Exemplary commercial CAs include Verisign (http://www.verisign. com) and GTE CyberTrust (http://www.cybertrust.gte. com).

Often there is a hierarchy of CAs in order to maintain a high level of trust in issued certificates. Usually, there is one root CA whom everybody trusts. The root CA may be an organization's headquarters, a professional body or a government agency. The root CA may issue certificates to a number of sub-level CAs that adhere to a set of policies dictated by the root CA. Each sub-level CA may issue certificates to CAs beneath it in the chain or to end users directly. Because of this hierarchy, two users with certificates issued by different CAs in the hierarchy will be able to mutually authenticate each other by verifying the signature of a higher level CA.

When a user sends a request to a server via a client, the user can attach his/her certificate with the request. On receiving the certificate, the server uses the user's certificate to verify that the user's public key is authentic and then uses that public key to verify the request itself. To do this, the server uses the CA's public key to verify the user's identity. If the server does not trust the CA who issued the user's certificate, the server can obtain the CA's certificate and verify it. This process can be repeated up the CA hierarchy as many times as required until the server reaches either a CA it trusts, or the root CA.

A widely accepted international standard for certificates is defined in the ISO authentication framework X.509 (http://www.rsa.com/rsalabs/newfaq /q165.html). This standard requires all certificates to contain a version number, a serial number, an algorithm identifier, the name of the issuer, the validity period, the subject or distinguished name, the subject public key, an issuer unique identifier, a subject unique identifier, an extension field and the CA's signature. The X.509 standard is supported by a number of transaction layer security protocols such as SSL.

Certificates are often used to limit access to server resources. In client-server networks, they are used to identify parties involved in a transaction or data exchange. For example, when a user wishes to access the FTP services of a server, he/she sends an FTP request to the server. The server requests the client's web browser to send the user's certificate for verification. The server checks the distinguished name on the certificate and then searches through an access control list (ACL) to determine if this user has authority to access the requested resources. Alternatively, the server may request the user to submit his/her name and a password. An ACL is a detailed list of users and groups that are explicitly given permission to access resources on servers. Unless a particular user, or the client IP address, is listed within an ACL and his or her access rights set forth therein, the user will not be able to access the requested resources.

Authentication Based On Sub-Fields

The distinguished name field within a certificate may include sub-fields such as those listed in Table 1:

TABLE 1 commonName
surname
serialNumber
countryName
localityName
collectiveLocalityName
stateOrProvinceName
collectiveStateOrProvinceName
streetAddress
collectiveStreetAddress
organizationName
collectiveOrganizationName
organizationalUnitName
collectiveOrganizationalUnitName
title
description TABLE 1-continued

```
searchGuide
businessCategory
postalAddress
collectivePostalAddress
postalCode
collectivePostalCode
postOfficeBox
collectivePostOfficeBox
physicalDeliveryOfficeName
```

According to one aspect of the present invention, user authentication via certificates may be performed without requiring that an ACL contain any information about the particular user. By using one or more sub-fields of the distinguished name field (or other certificate fields), authentication may be performed on a more generalized basis. For example, access rights to a particular server resource may be granted to all users having the sub-field organizationName="International Business Machines." Access to another server resource may be granted to only those users having the sub-field organizationName="International Business Machines" and sub-field organizationalUnitName="Human Resources."

By defining access rules on a more generalized basis using sub-fields, or combinations of fields/sub-fields, ACLs do not need to be updated whenever a new user is granted access to server resources, or an existing user is denied access. For large organizations, this approach reduces many administrative burdens with respect to ACL maintenance Multiple fields and sub-fields may be used in combination, according to the present invention. Accordingly, complex access rules can be defined within an ACL without requiring individual user identification information. For example, access to time card records located on a server may be granted only to users having certificates with the distinguished name sub-fields in Table 2:

TABLE 2

```
organizationName = "IBM"
organizationalUnitName = "Human Resources
title = "Manager"
businessCategory = "Personal Computers"
```

The present invention is not limited to the use of distinguished name sub-fields. Other fields within a certificate may be used with ACL rules defined accordingly. For example, certain access rights may be granted based upon the issuing CA, or upon any CA in the hierarchy. Furthermore, combination rules may be based upon specific user information and non-specific user information, including "time of day."

Figure 2:
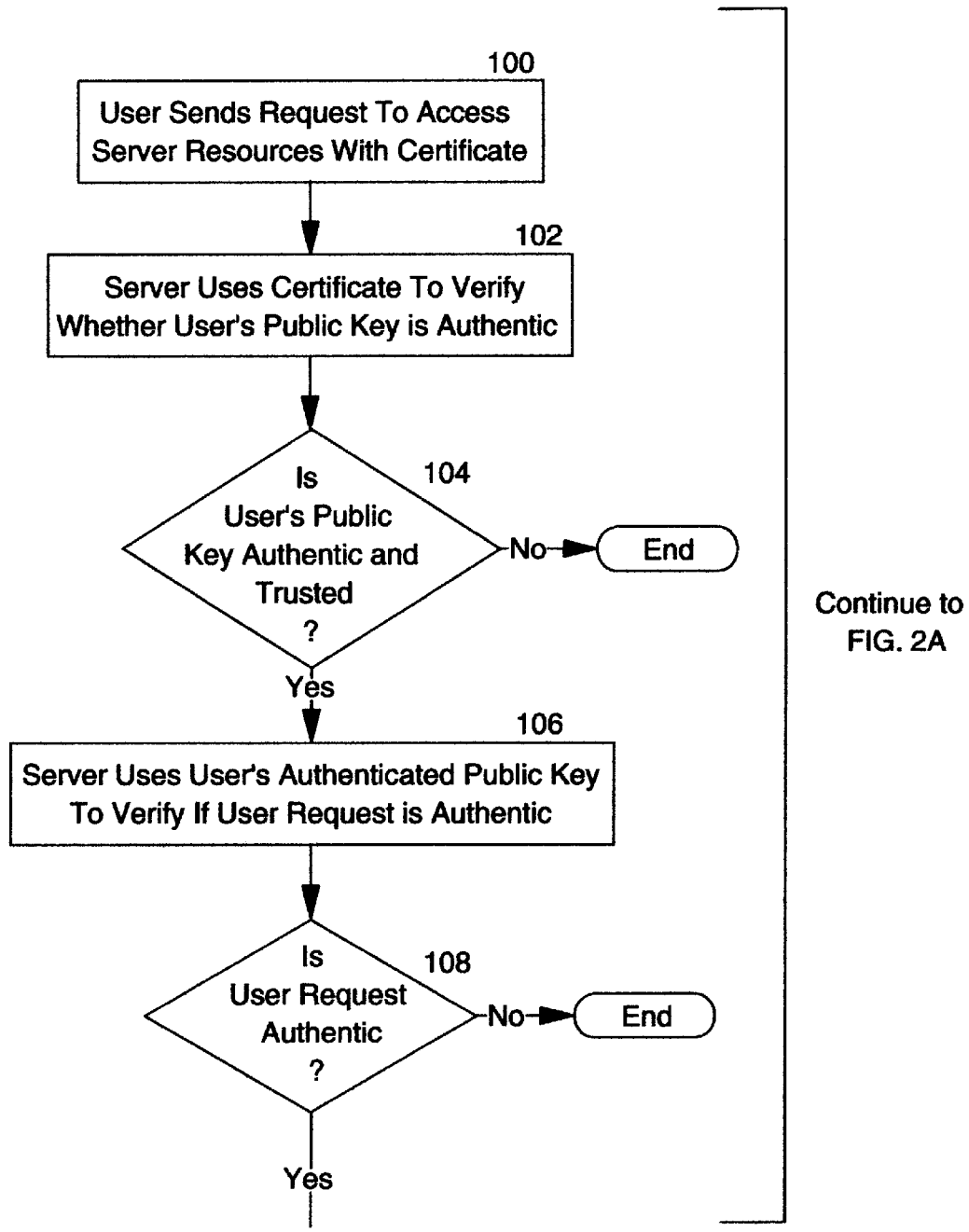
FIG. 2 is a flowchart schematically illustrating operations for various aspects of the present invention.
Figure 2A:
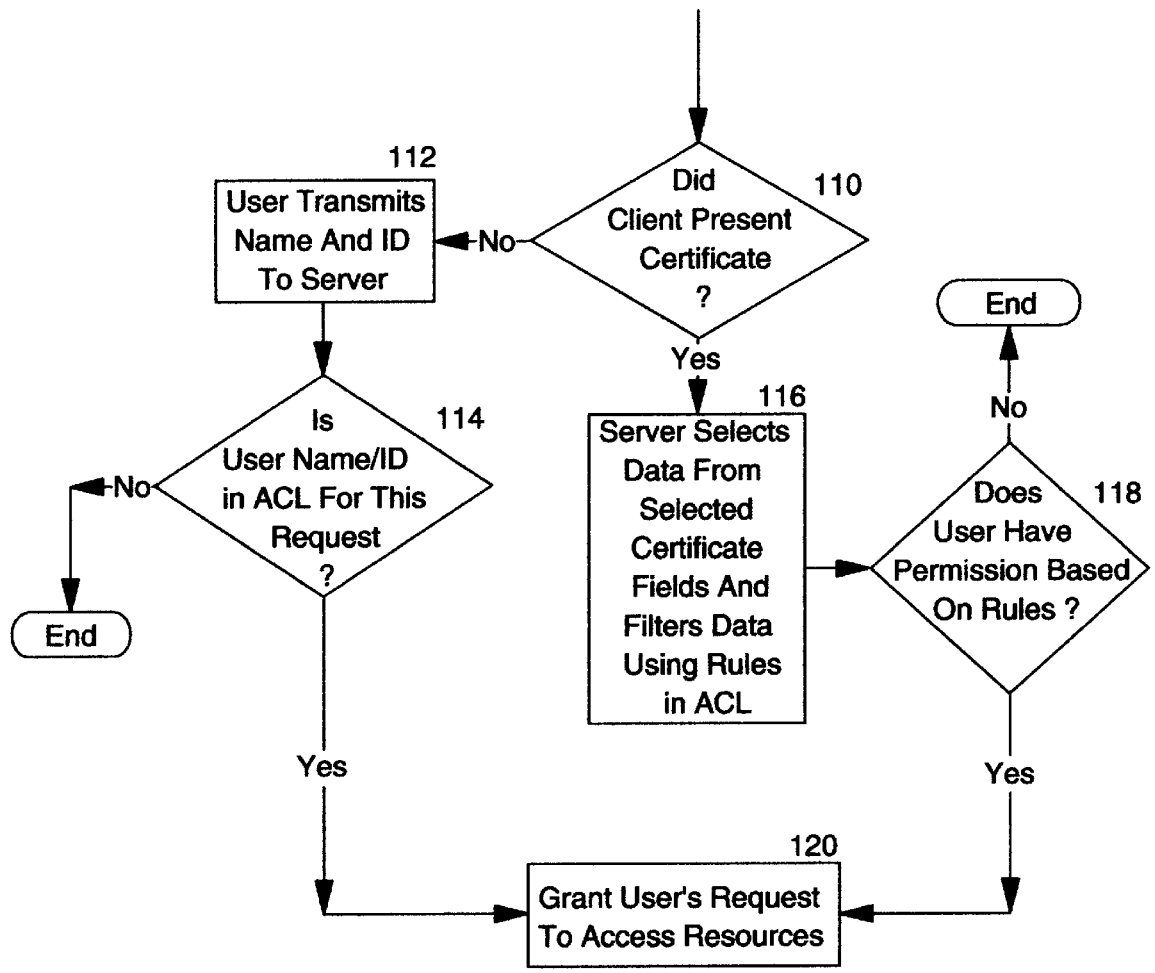

Operations for various aspects of the present invention are schematically illustrated in FIG. 2. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring now to FIG. 2, operations for authenticating a user request to access server resources, according to aspects of the present invention, are schematically illustrated. A user sends a request to access server resources via a client (Block 100). The client transmits a certificate to the server with the user request. The server uses the certificate to verify whether the user's public key contained within the certificate is authentic (Block 102). A determination is made whether the user's public key is valid and trusted (Block 104). If the user's public key is not authentic, or the certificate was not issued by a CA trusted by the server, operations are terminated and the server ignores the user request.

If the user's public key is authentic and trusted, the server uses the user's public key to verify if the user's request is authentic (Block 106). This step is included to insure that a third party has not corrupted or generated the request. A determination is made whether the user request is authentic (Block 108). If the user's request is not authentic, operations are terminated and the server ignores the user request. If the user's request is authentic, then a determination is made whether the client presented a certificate (Block 110). If the answer is no, the server requires the user to transmit a user name and ID or password to the server (Block 112). The server then determines whether the ACL for the requested resources has the user's name/ID and password listed as authorized to access the requested resources (Block 114). If the user is not authorized in the ACL to access the requested resources, operations are terminated. If the user is authorized in the ACL to access the requested resources, the server grants the user's request (Block 120).

If the client does present a certificate (Block 110), the server selects data contained within selected fields within the certificate and filters this data using predefined filter rules contained within the ACL (Block 116). A determination is made whether information contained within fields, or a combination of fields and/or sub-fields, of the certificate satisfy predefined rules in the ACL (Block 118). If the answer is no, operations are terminated and the server ignores the user request. If the answer is yes, the server grant's the user's request (Block 120).

EXAMPLES

A news service provides up-to-date news to authorized clients via a server. The news service is designed to tailor content according to each authorized client. For example, if a client request for news is received from an IBM client, the news service is designed to provide some information about IBM, such as current stock price, within the news delivered to the client. For each request, the server parses through the sub-fields of the distinguished name to identify the name of the organization to which this client belongs. If the server determines the request was made from an IBM client, it provides the requested news along with some information about IBM. Similarly, if the server determines that the client belongs to another client organization authorized to receive news, it provides the requested news along with some information about that particular organization. The server does not require the user making the request to identify himself or herself.

As another example, if a client tries to retrieve IBM confidential data from a web server, the client is granted access based on whether the certificate contains "IBM" as the organization.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of authenticating a client request to access server resources without uniquely identifying a client IP address or a user making the client request, the method comprising the steps of:

receiving at an Access Control List (ACL) a certificate associated with the user making the client request, wherein the certificate comprises a plurality of data fields, and wherein the ACL does not contain information that can uniquely identify a client IP address or a user making the client request;

selecting data from at least one of the certificate data fields; and filtering the selected data using at least one predefined filter rule associated with the ACL to authenticate the client request without uniquely identifying a client IP address or a user making the client request.

2. A method according to claim 1 wherein the step of selecting data from at least one of the certificate data fields comprises selecting data from a plurality of the certificate data fields.

3. A method according to claim 1 wherein the step of selecting data from at least one of the certificate data fields, comprises selecting data from at least one sub-field of a certificate field.

4. A method according to claim 1 wherein the at least one predefined rule comprises a plurality of predefined filter rules.

5. A method according to claim 4 wherein the step of filtering comprises filtering data selected from a plurality of certificate fields using a plurality of predefined rules associated with the ACL.

6. A method according to claim 1 further comprising the steps of:

requesting the client to send additional information to the server;

receiving the additional information at the ACL; and filtering the received additional information using at least one predefined filter rule associated with the ACL.

7. A method according to claim 1 wherein the step of selecting data from at least one of the certificate data fields comprises selecting data from sub-fields of a distinguished name field.

8. A data processing system for authenticating a client request to access server resources without uniquely identifying a client IP address or a user making the client request, the data processing system comprising:

means for receiving at an Access Control List (ACL) a certificate associated with the user making the client request, wherein the certificate comprises a plurality of data fields, and wherein the ACL does not contain information that can uniquely identify a client IP address or a user making the client request;

means, responsive to the certificate receiving means, for selecting data from at least one of the certificate data fields; and means, responsive to the data selecting means, for filtering the selected data using at least one predefined filter rule associated with the ACL to authenticate the client request without uniquely identifying a client IP address or a user making the client request.

9. A data processing system according to claim 8, wherein the means for selecting data from at least one of the certificate data fields comprises means for selecting data from a plurality of the certificate data fields.

10. A data processing system according to claim 8, wherein the means for selecting data from at least one of the certificate data fields, comprises means for selecting data from at least one sub-field of a certificate field.

11. A data processing system according to claim 8, wherein the at least one predefined rule comprises a plurality of predefined filter rules.

12. A data processing system according to claim 8, wherein the means for filtering the selected data comprises means for filtering data selected from a plurality of certificate fields using a plurality of predefined rules associated with the ACL.

13. A data processing system according to claim 8, further comprising:

means for requesting the client to send additional information to the server;

means for receiving the additional information at the ACL; and means, responsive to the receiving means, for filtering the received additional information using at least one predefined filter rule associated with the ACL.

14. A data processing system according to claim 8, wherein the means for selecting data from at least one of the certificate data fields comprises means for selecting data from sub-fields of a distinguished name field.

15. A computer program product for authenticating a client request to access server resources without uniquely identifying a client IP address or a user making the client request, the computer program product comprising:

a computer usable medium having computer readable program code means embodied in the medium for receiving at an Access Control List (ACL) a certificate associated with the user making the client request, wherein the certificate comprises a plurality of data fields, and wherein the ACL does not contain information that can uniquely identify a client IP address or a user making the client request;

the computer usable medium having computer readable program code means embodied in the medium, responsive to the certificate receiving means, for selecting data from at least one of the certificate data fields; and the computer usable medium having computer readable program code means embodied in the medium, responsive to the data selecting means, for filtering the selected data using at least one predefined filter rule associated with the ACL to authenticate the client request without uniquely identifying a client IP address or a user making the client request.

16. A computer program product according to claim 15, wherein the computer readable program code means embodied in the medium for selecting data from at least one of the certificate data fields comprises computer readable program code means for selecting data from a plurality of the certificate data fields.

17. A computer program product according to claim 15, wherein the computer readable program code means embodied in the medium for selecting data from at least one of the certificate data fields, comprises computer readable program code means for selecting data from at least one sub-field of a certificate field.

18. A computer program product according to claim 15, wherein the at least one predefined rule comprises a plurality of predefined filter rules.

19. A computer program product according to claim 15, wherein the computer readable program code means embodied in the medium for filtering the selected data comprises computer readable program code means for filtering data selected from a plurality of certificate fields using a plurality of predefined rules associated with the ACL.

20. A computer program product according to claim 15, further comprising:

computer readable program code means embodied in the medium for requesting the client to send additional information to the server;

computer readable program code means embodied in the medium for receiving the additional information at the ACL; and computer readable program code means embodied in the medium, responsive to the receiving means, for filtering the received additional information using at least one predefined filter rule associated with the ACL.

21. A computer program product according to claim 15, wherein the computer readable program code means embodied in the medium for selecting data from at least one of the certificate data fields comprises computer readable program code means for selecting data from sub-fields of a distinguished name field.

* * * * *